United States Patent
Kim et al.

(10) Patent No.: US 10,081,263 B2
(45) Date of Patent: Sep. 25, 2018

(54) THREE-PHASE WIRELESS POWER TRANSFER SYSTEM AND THREE-PHASE WIRELESS CHARGEABLE UNMANNED AERIAL VEHICLE SYSTEM BASED ON THE SAME

(71) Applicant: Korea Advanced Institute of Science and Technology, Daejeon (KR)

(72) Inventors: Joung-Ho Kim, Daejeon (KR); Chi-Uk Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 112 days.

(21) Appl. No.: 15/429,747

(22) Filed: Feb. 10, 2017

(65) Prior Publication Data

US 2018/0056794 A1    Mar. 1, 2018

(30) Foreign Application Priority Data

Aug. 24, 2016  (KR) .......................... 10-2016-0107444

(51) Int. Cl.
*H02J 7/00*        (2006.01)
*B60L 11/18*       (2006.01)
*B64C 39/02*       (2006.01)

(52) U.S. Cl.
CPC .......... *B60L 11/182* (2013.01); *B64C 39/024* (2013.01); *B60L 2200/10* (2013.01); *B60L 2210/30* (2013.01); *B64C 2201/042* (2013.01)

(58) Field of Classification Search
CPC ................ B60L 11/182; B60L 2200/10; B60L 2210/30; B64C 2201/042; B64C 39/024
See application file for complete search history.

(56) References Cited

U.S. PATENT DOCUMENTS

| 4,379,261 A | * | 4/1983 | Lakin | .................... G01N 27/904 |
| | | | | 324/232 |
| 4,999,467 A | * | 3/1991 | Iguchi | .................... H05B 6/105 |
| | | | | 219/624 |

(Continued)

OTHER PUBLICATIONS

"Three-phase magnetic field design for low EMI and EMF automated resonant wireless power transfer charger for UAV"; Song et all.; 2015 IEEE Wireless Power Transfer Conference (WPTC); Year: 2015; pp. 1-4; Cited by: Papers (4).*

*Primary Examiner* — Helen Rossoshek
(74) *Attorney, Agent, or Firm* — Daly, Crowley, Mofford & Durkee, LLP

(57) ABSTRACT

Disclosed are a three-phase wireless power transfer (WPT) system and three-phase wireless rechargeable unmanned aerial vehicle (UAV) system based on the same. Three power receiving coils, including resonators, are installed at the ends of three landing leg of the UAV. A three-phase power converter installed in the UAV receives the three-phase AC induction current induced in three power receiving coils, including resonators, converting the three-phase AC induction current into a DC current to be charged in a battery. A three-phase power wireless charging apparatus wirelessly transfers three-phase power from three power transmitting coils to the three power receiving coils of the UAV when the three landing legs land on three coil seating units provided on a charging platform. A magnetic flux leakage shielding coil may be provided to prevent magnetic flux leakage from approaching the UAV. The power transfer efficiency is excellent, and electromagnetic interference can be also reduced.

20 Claims, 10 Drawing Sheets

(56) References Cited

U.S. PATENT DOCUMENTS

| | | | |
|---|---|---|---|
| 8,461,719 B2 * | 6/2013 | Kesler | B60L 11/007 307/104 |
| 9,678,507 B1 * | 6/2017 | Douglas | G08G 5/003 |
| 9,704,409 B2 * | 7/2017 | Prakash | B64C 39/024 |
| 2005/0237687 A1 * | 10/2005 | Takahashi | H02J 7/163 361/92 |
| 2008/0284367 A1 * | 11/2008 | Kawashima | H02M 1/126 318/700 |
| 2009/0058584 A1 * | 3/2009 | Rastogi | H01F 27/24 336/5 |
| 2012/0300524 A1 | 11/2012 | Fornage et al. | |
| 2013/0002855 A1 * | 1/2013 | Ratti | H04N 13/388 348/117 |
| 2014/0139182 A1 | 5/2014 | Ichikawa et al. | |
| 2014/0232180 A1 * | 8/2014 | Kinomura | B60L 11/12 307/9.1 |
| 2014/0312706 A1 * | 10/2014 | Fiorello | H02J 50/40 307/104 |
| 2014/0354386 A1 * | 12/2014 | Adar | H01F 27/25 336/5 |
| 2016/0139596 A1 * | 5/2016 | Na | B64C 39/024 701/2 |
| 2016/0304217 A1 * | 10/2016 | Fisher | B60L 11/1809 |
| 2017/0136896 A1 * | 5/2017 | Ricci | B60L 11/182 |
| 2017/0141584 A1 * | 5/2017 | DeVaul | H04W 76/14 |
| 2017/0158353 A1 * | 6/2017 | Schmick | B64F 1/007 |
| 2018/0009527 A1 * | 1/2018 | Von Novak, III | B64C 39/024 |
| 2018/0033315 A1 * | 2/2018 | Winkle | B60L 11/1824 |
| 2018/0044000 A1 * | 2/2018 | Venturelli | B64C 25/405 |

* cited by examiner

THREE-PHASE WIRELESS POWER TRANSFER SYSTEM AND THREE-PHASE WIRELESS CHARGEABLE UNMANNED AERIAL VEHICLE SYSTEM BASED ON THE SAME

CROSS-REFERENCE TO RELATED APPLICATION

This application claims priority under 35 USC § 119 to Korean Patent Application No. 10-2016-0107444, filed on Aug. 24, 2016 in the Korean Intellectual Property Office (KIPO), the contents of which are herein incorporated by reference in their entirety.

BACKGROUND

1. Technical Field

The present invention relates to a technology for a wireless power transfer (WPT) and its application to a wireless chargeable unmanned aerial vehicle (UAV), and more particularly to a technology for wirelessly charging three-phase AC power and a three-phase wireless chargeable UAV system based on the technology.

2. Description of the Related Art

Among the various devices driven by electric energy, there are many devices that need to supply the electric energy frequently through charging. Electric energy is charged in a wired manner in many devices, but in recent years the number of devices charged in a wireless manner is increasing.

For example, the UAV, also known as a "drone", rotates the propellers by motor power to fly. The UAV has a means for charging electric energy, which is charged and used as a power source as necessary. Recently, interest in wireless charging technology to utilize the advantage of wireless charging method in the UAV is increasing. Conventional wireless charging systems for the UAV have been designed based on a single-phase wireless charging scheme using a single phase inverter. However, the single-phase WPT has poor power transfer efficiency. There is a need for a WPT method of which power transfer efficiency is good.

In general, the UAV is equipped with various electronic components for controlling its flight. A strong electromagnetic field that occurs during wireless charging can cause damages or errors in its electronic components. When a single-phase wireless charging system is applied to the UAV, there is a disadvantage in that, in addition to the disadvantages mentioned above, additional measures are required to prevent the electronic components from the electromagnetic interference (EMI), which causes increase in its weight. There is also a need for measures to solve this problem.

SUMMARY

Accordingly, the present disclosure is directed to provide a three-phase WPT system capable of wirelessly transferring electric energy to be used as a power source for electric devices in the three-phase manner.

The present disclosure is directed to provide a UAV capable of wirelessly charging in a three-phase manner the electric energy to be used as a power source for rotating the propellers.

In addition, the present disclosure is directed to provide a three-phase wireless charging apparatus on which the UAV can dock and wirelessly charging the docked UAV in the three-phase manner.

According to some embodiments of the present disclosure, a three-phase wireless-chargeable UAV is provided. The three-phase wireless-chargeable UAV includes a flight vehicle, a three-phase power reception unit, a three-phase power converter, and a battery. The flight vehicle includes at least three landing legs. The three-phase power reception unit includes three coil winding members provided on three landing legs and provided as magnetic paths of magnetic fluxes, and three power receiving coils that are wound around or built in the three coil winding members respectively and connected to each other in a Y-connection or Δ-connection. The three-phase power reception unit wirelessly receives power from a three-phase wireless power transfer (WPT) apparatus through three-phase alternating currents (AC) which are induced by three-phase alternating magnetic fluxes, generated by the three-phase WPT apparatus, that interlink with the three power receiving coils, respectively. The three-phase power converter is installed in the flight vehicle and converts the three-phase ACs induced in the three power receiving coils into a direct current (DC). Being installed in the flight vehicle, the battery charges the DC output from the three-phase power converter. The battery may serve as an electric power source for the UAV.

The three-phase power reception unit may further include a protection cap for protecting the coil winding member and the power receiving coils by enclosing the same together.

The three-phase wireless-chargeable UAV may further include a resonator, being connected to each of the three power receiving coils, for minimizing reactive power in a system by causing a resonance current to flow through each of the three power receiving coils.

Each of the three coil winding members may be connected to an end of each of the three landing legs and function as a landing part of the UAV.

The at least three landing legs may adopt at least any one of a foldable structure and a length-variable structure.

Meanwhile, according to embodiments of the present disclosure, there is provided a three-phase wireless-charging apparatus for an UAV. The three-phase wireless-charging apparatus includes a charging platform, and a three-phase power transmission unit. The charging platform includes a coil seating unit for seating three power receiving coils that are connected to each other in a Y-connection or Δ-connection and installed in the UAV for wirelessly receiving electric power. The three-phase power transmission unit includes three power transmitting coils that are installed in the coil seating unit and connected to each other in a Y-connection or Δ-connection. The three-phase power transmission unit forms three magnetic fields in the coil seating unit by flowing three-phase ACs. In the three-phase wireless-charging apparatus, when the three power receiving coils are seated on the coil seating unit, the three power transmitting coils are magnetically coupled with the three power receiving coils through the three magnetic fields, thereby wirelessly transferring three-phase power to the three power receiving coils.

The coil seating unit may include three coil seating sinks for receiving the three power receiving coils, respectively.

The three power receiving coils may be installed on three landing legs of the UAV. When the three landing legs are seated in the three coil seating sinks, the three power receiving coils can be automatically positioned in the three magnetic fields generated by the three power transmitting coils, respectively.

Each of the three coil seating sinks may include a circular conical surface forming an inlet that becomes gradually narrower from the top to the bottom, and an insertion groove provided at the lowest position of the circular conical surface. Each of the power transmitting coils may be disposed in the insertion groove. The landing legs can slide downward when each of the three landing legs lands at any point on the circular conical surface so as to automatically enter the insertion groove and to be positioned in each of the three magnetic fields.

At least a side wall and a bottom defining the insertion groove may be made of a ferromagnetic material and provided as a magnetic path for a magnetic flux generated by each of the three power transmitting coils.

The three-phase wireless-charging apparatus may further include a transmitter resonator, which is connected to each of the three power transmitting coils, for allowing a resonant current to flow through the three power transmitting coils.

The three-phase power transmission unit may further include a three-phase power inverter for changing a DC into three-phase ACs of a desired frequency and providing the three-phase ACs to each of the three power transmitting coils.

The transmitter resonator may include a plurality of resonance capacitors connected in series or in parallel to each of the three power transmitting coils.

The three-phase wireless-charging apparatus may further include three magnetic flux leakage shielding coils for shielding magnetic flux leakage without being interlinked with the three power receiving coils among the magnetic fluxes generated by the three power transmitting coils, thereby minimizing an influence of the magnetic flux leakage on a magnetic flux leakage region.

The three-phase wireless-charging apparatus may further include a leakage resonator, being connected to each of the three magnetic flux leakage shielding coils, for cancelling the magnetic flux leakage based on resonance caused by a current induced by the magnetic flux leakage.

The leakage resonator may include at least any one of three first leakage resonators causing resonance corresponding to an operating frequency component of a system and three second leakage resonators causing resonance corresponding to the harmonic frequency components of the system.

The leakage resonator may include at least one isolation inductor and at least one resonance capacitor connected to both ends of the magnetic flux leakage shielding coil to form an RLC resonance circuit.

The three magnetic flux leakage shielding coils may be disposed around entrances of the coil seating units, respectively.

According to the embodiments of the present disclosure, there is provided a three-phase WPT system which includes a three-phase power transmission unit and a three-phase power reception unit. The three-phase power transmission unit includes three power transmitting coils for generating magnetic fields by allowing three-phase alternating currents to flow, respectively, and transmitter resonators, which are coupled to the three power transmitting coils respectively, for allowing resonant currents for minimizing a reactive power in a system to flow. The three-phase power reception unit includes three power receiving coils and three receiver resonators. The three power receiving coils are arranged to be paired with the three power transmitting coils one to one such that each of the three power receiving coils is interlinked with the magnetic flux generated by each of the three power transmitting coils, thereby allowing an induced current to flow by the magnetic flux interlinkage. The three receiver resonators are added to each of the three power receiving coils so as to allow resonant currents to flow for minimizing reactive power in the system.

The three-phase power transmission unit may further include a three-phase power inverter that changes DC to three-phase ACs of a desired frequency and provides the three-phase ACs to the three power transmitting coils, respectively.

The three-phase power reception unit may include a three-phase power converter and a battery. The three-phase power converter converts three-phase ACs induced by the three receive resonators and the three power receiving coils into a DC. The battery charges the DC output from the three-phase power converter.

The three-phase WPT system may further include three magnetic flux leakage shielding coils for shielding magnetic flux leakages without being interlinked with the three power receiving coils among the magnetic fluxes generated by the three power transmitting coils, thereby minimizing influence of the magnetic flux leakage on a magnetic flux leakage region.

In the past, wireless charging of the UAV was done using a single-phase charging system with a single-phase inverter. However, in a wireless charging system using a single-phase inverter, the charging current is large and accordingly a strong magnetic field appears around the wireless charging system, thereby causing EMI noise or the like.

On the other hand, if the wireless charging is performed by using the magnetic field resonance based WPT system employing the three-phase inverter like the present disclosure, magnitude of the current flowing in each phase of the three-phase mode can be reduced compared to that of the single-phase mode. As the magnitude of the current decreases, intensity of the magnetic field formed around the wireless charging system can also be reduced. The EMI noise can also be reduced due to the characteristics of the three-phase system. Further, the ripple in the output of the entire three-phase wireless charging system can be reduced and the power transfer efficiency can be increased.

In addition, by providing the wireless charging system with a magnetic flux leakage shielding coil, the magnetic field leakage directed to the center of the UAV, where various electronic flying devices (such as a global positioning system (GPS), a speed controller, and a Bluetooth data link) and/or an article to be delivered are located, can be blocked. It can contribute to stable flight.

Combining this wireless charging technology with the automatic take-off and landing technology of the UAV enables the user to conveniently charge the UAV without having to directly replace the battery.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
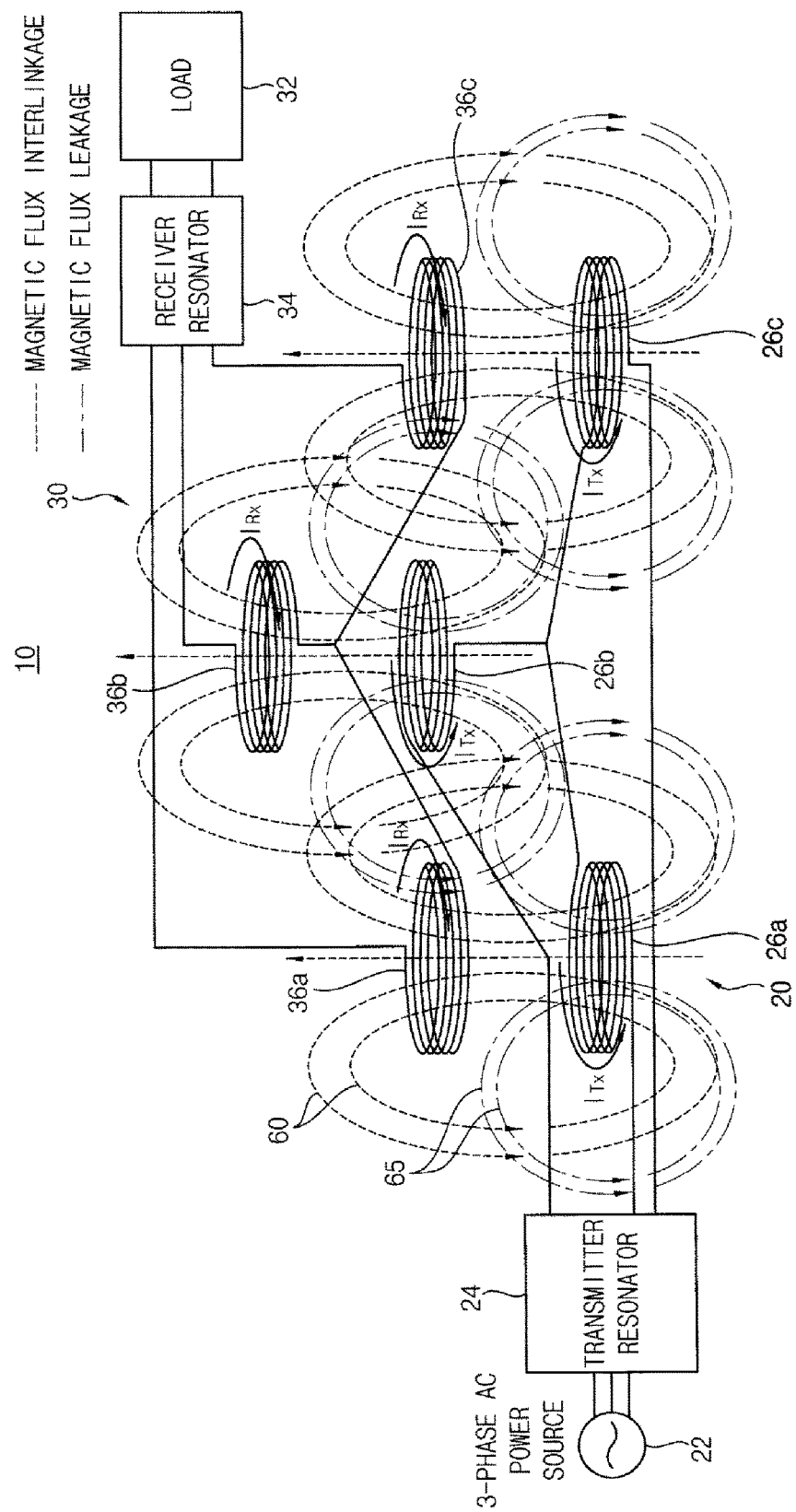
FIG. 1 illustrates a schematic diagram of a three-phase WPT system according to an exemplary embodiment of the present disclosure.

Advantages and features of the present inventive concept and methods of accomplishing the same will become apparent with reference to the embodiments that will be described below in detail, along with the accompanying drawings. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," "include" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With reference to the accompanying drawings, preferred embodiments of the present inventive concept will be described in detail. The same numeral reference will be assigned to the same element in the drawings.

FIG. 1 illustrates a schematic diagram of a three-phase WPT system to transfer three-phase AC power in a wireless manner according to an exemplary embodiment of the present disclosure. In an exemplary embodiment, the illustrated three-phase AC power wireless transfer system 10 may include a three-phase AC power transmission unit 20 for wirelessly transmitting three-phase AC power, and a three-phase power reception unit 30 for wirelessly receiving the three-phase AC power. This system 10 may be the basis of a three-phase wireless charging system for the UAV to be described later.

In an exemplary embodiment, the three-phase AC power transmission unit 20 may include three power transmitting coils 26a, 26b and 26c and a transmitter resonator 24. The three-phase AC power source 22 is required for the three-phase AC power transmission unit 20. The three-phase AC power source 22 may be a three-phase power inverter that changes a DC to three-phase ACs of a desired frequency and provides the ACs to each of the three power transmitting coils 26a, 26b and 26c. The three power transmitting coils 26a, 26b and 26c are connected to the three-phase AC power source 22 and allow the three-phase ACs supplied from the three-phase AC power source 22 to flow, respectively. As a result, a magnetic field can be formed around each of the power transmitting coils 26a, 26b, and 26c. The transmitter resonator 24 is added to each of the three power transmitting coils 26a, 26b, and 26c to allow the resonance currents to flow in order to minimize the reactive power in the system 10.

In an exemplary embodiment, the three-phase power reception unit 30 may include three power receiving coils 36a, 36b, and 36c and a receiver resonator 34. The three power receiving coils 36a, 36b and 36c are disposed to be paired with the three power transmitting coils one to one so that each of the three power receiving coils 36a, 36b and 36c is interlinked as much as possible with the magnetic flux generated by each of the three power transmitting coils 26a, 26b and 26c. By this arrangement, the time-varying magnetic fluxes generated by the three power transmitting coils 26a, 26b and 26c are interlinked with the three power receiving coils 36a, 36b and 36c, respectively, whereby three-phase ACs are induced in the three power receiving coils 36a, 36b and 36c, respectively.

In an exemplary embodiment, each of the three power receiving coils 36a, 36b and 36c may be provided with the receiver resonator 34. The receiver resonator 34 can allow a resonance current for minimizing the reactive power in the system 10 to flow. The three-phase ACs induced by the receiver resonator 34 and the three power receiving coils 36a, 36b and 36c, may be provided to a load 32.

In FIG. 1, the power receiving coils 36a, 36b and 36c are disposed above the power transmitting coils 26a, 26b and 26c, respectively. However, this is just an example.

Other disposition is available as long as the magnetic flux leakage 65 out of the entire magnetic fluxes generated from the power transmitting coils 26a, 26b and 26c can be minimized. As an available exemplary disposition, the power receiving coils 36a, 36b and 36c are surrounded with the power transmitting coils 26a, 26b and 26c one to one, or vice versa, that is, the power transmitting coils 26a, 26b and 26c are surrounded with the power receiving coils 36a, 36b and 36c one to one. These dispositions are advantageous in minimizing magnetic flux leakage.

The three-phase power transmitting coils 26a, 26b and 26c may be connected to each other in the form of Y-connection or Δ-connection. The three-phase power receiving coils 36a, 36b and 36c may also be connected to each other in the form of Y-connection or Δ-connection. Therefore, the three-phase power transmitting coils 26a, 26b and 26c and the three-phase power receiving coils 36a, 36b and 36c can be coupled with each other in any one type among the following four types: Δ-Δconnection, Δ-Y connection, Y-Y connection, and Y-Δ connection.

In this three-phase AC power wireless transfer system 10, when three-phase ACs are flowed in the direction of the arrow in the three power transmitting coils 26a, 26b and 26c, respectively, of the three-phase power transmission unit 20, magnetic fluxes as indicated by a dotted line are generated around the three power transmitting coils 26a, 26b and 26c, respectively. At this time, a resonance current can flow through each of the three power transmitting coils 26a, 26b and 26c due to the transmitter resonator 24. The magnetic fluxes generated by the power transmitting coils 26a, 26b and 26c are interlinked with the corresponding power receiving coils 36a, 36b and 36c, respectively. Due to the interlinkage of the magnetic fluxes, voltages are induced in the power receiving coils 36a, 36b and 36c, respectively, thereby inducing currents flowing in the direction of the arrow due to the induced voltages, $V_{induced}$. Each of the induced currents flowing at this time is a resonant current due to the resonance effect of the receiver resonator 34. These resonant induced currents are provided to the load 32.

In an exemplary embodiment, the transmitter resonator 24 may include at least three first resonance capacitors which are connected to the three power transmitting coils 26a, 26b and 26c, respectively. The receiver resonator 34 may also include at least three second resonance capacitors which are connected to the three power receiving coils 36a, 36b and 36c, respectively. Each of the first resonance capacitors and its corresponding power transmitting coils 26a, 26b and 26c may be connected to each other in series or in parallel. Likewise, each of the second resonance capacitors and its corresponding power receiving coils 36a, 36b and 36c may be connected to each other in series or in parallel. Therefore, there are four possible coil-capacitor connection topologies, which are series-to-series connection, series-to-parallel connection, parallel-to-parallel connection, and parallel-to-serial connection, between the transmitting and receiving sides. When the load 32 is viewed from the power source 22 on the power transmission side, the value of the resonance capacitor may vary because the reflected impedance is different. However, if the load 32 is a battery, there is a change in the load during the battery is charged wirelessly. Therefore, it can be said that the serial-serial connection topology, which includes a serial connection between the power transmitting coil and the first resonance capacitor and a serial connection between the power receiving coil and the second resonance capacitor; is most advantageous for maintaining high power transfer efficiency.

The resonance capacitors are added to each of the coils of the power transmission and reception sides, thereby constituting LC resonance circuits on both sides. Strictly speaking, actually RLC resonant circuits are formed on the both sides, respectively, even when considering the equivalent series resistance component included in the coil. Due to the transmitter resonator 24 and the receiver resonator 34, the electric energy can be wirelessly transferred with a high efficiency from the power transmission side to the power reception side. That is, the voltages induced in the power receiving coils 36a, 36b and 36c, which are secondary coils, can be increased even with small inductance, thereby contributing to enhancement of power transfer efficiency. The resonators 24 and 34 can serve to reduce the magnitude of the power of the three-phase AC power source 22 for transmitting the power required for the load 32. As a result, the intensity of electromagnetic waves generated from the power transmitting coils 26a, 26b and 26c can be reduced. In addition, a high frequency is used in the WPT, which can reduce the size of the total system by employing the resonators 24 and 34. The high frequency also has an advantage of reducing the size of the resonance capacitor used in the resonators 24 and 34.

Depending on the mutual arrangement relationship between the power transmitting coils 26a, 26b and 26c and the power receiving coils 36a, 36b and 36c, a part of the entire magnetic fluxes generated by the power transmitting coils 26a, 26b and 26c may be leaked without being interlinked with the power receiving coils 36a, 36b and 36c. The larger the magnetic flux leakage, the lower the power transfer efficiency. The magnetic flux leakage may cause EMI to be generated in the electronic devices. It may be necessary to take measures to minimize the leakage amount of the magnetic flux generated by the power transmitting coils 26a, 26b and 26c and to prevent the magnetic flux from being directed to a specific area. A conductive coil can be used as a magnetic flux leakage blocking means. That is, a magnetic flux leakage shielding coil, as an exemplary example, may be disposed in each of the specific areas to which the magnetic fluxes generated by the power transmitting coils 26a, 26b and 26c are directed, respectively. When a time-varying magnetic flux is applied to the magnetic flux leakage shielding coil, a voltage is induced in the magnetic flux leakage shielding coil. The induction voltage generates a flow of induction current through the magnetic flux leakage shielding coil and thus the induction current generates a separate magnetic flux around the magnetic flux leakage shielding coil. The magnetic flux thus generated is directed to a direction that is opposite to the direction of the magnetic flux applied to the magnetic flux leakage shielding coil from each of the power transmitting coils, and thus serves to cancel the magnetic flux from each of the power transmitting coils. As a result, the intensity of the magnetic flux directed to the rear of the magnetic flux leakage shielding coil can be greatly reduced.

In an exemplary embodiment, the load 32 may include a three-phase power converter that receives the three-phase ACs and converts them into a DC, and a battery that charges the DC output from the three-phase power converter. The electrical energy stored in the battery can be consumed when needed. Needless to say, the load 32 may be an electric device that directly consumes electric energy transmitted through the three-phase ACs.

Figure 2:
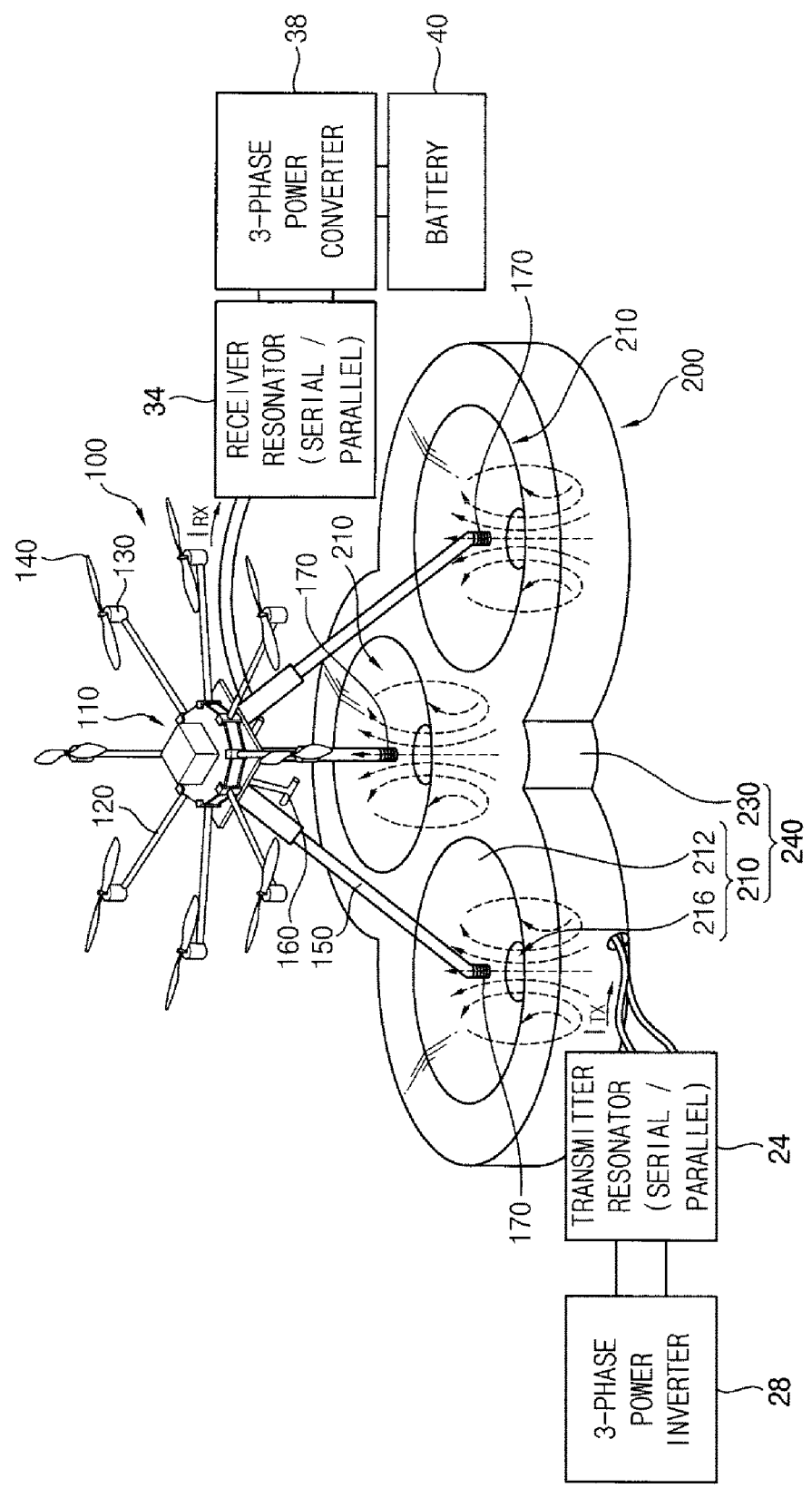
FIG. 2 illustrates a schematic diagram of a three-phase wireless chargeable UAV system including a three-phase wireless rechargeable UAV and a three-phase wireless charging apparatus for the UAV, according to an exemplary embodiment of the present disclosure.

In an exemplary embodiment, the three-phase WPT system 10 can be applied to an UAV. FIG. 2 schematically shows an overall configuration of a three-phase wireless charging system 90 for the UAV.

In an exemplary embodiment, the three-phase wireless charging system 90 may be based on the three-phase WPT system 10 shown in FIG. 1. The three-phase wireless charging system 90 may include a three-phase wireless chargeable UAV 100 and a three-phase power wireless charging station 200 for wirelessly charging the UAV 100 with electric energy in a three-phase mode. The three-phase power transmission unit 20 may be installed in the three-phase power wireless charging station 200 and the three-phase power reception unit 30 may be installed in the UAV 100.

According to an exemplary embodiment, the three-phase power wireless charging station 200 may include a three-phase power transmission unit 20 and a charging platform 240 in which the three-phase power transmission unit 20 is installed. The charging platform 240 may include three coil seating units 210 and a connection support 230 for integrating and supporting the three coil seating units 210 in unison with each other.

In an exemplary example, the three coil seating units 210 may be provided such that three power receiving coils 174 are seated in the magnetic flux regions generated by the three power transmitting coils 218, respectively, which may be connected to each other in Y-connection or Δ-connection, to receive power wirelessly. Specifically, each of the three coil seating units 210a, 210b, and 210c may be provided in a form of seating sink which may be a funnel structure, for example. That is, each of the three coil seating units may include a conical surface 212 forming an inlet that becomes gradually narrower from the top to the bottom, and an insertion groove structure 216 provided at the lowest position of the conical surface 212 so as to allow the power receiver 170 provided at the end of the landing leg 150 of the UAV 100 to be inserted into the insertion groove structure 216. Each of the power transmitting coils 218 is disposed inside the insertion groove structure 216. When the power receiver 170 is inserted into the insertion groove structure 216, the power receiving coil 174 is automatically placed in a state that the power receiving coil 174 is surrounded by the power transmitting coil 218. Preferably, entrance of the conical surface 212 and the insertion groove structure 216 may be circular.

In an exemplary embodiment, at least the sidewall and the bottom of the insertion groove structure 216 of each of the three coil seating units 210 may be made of a ferromagnetic material having an excellent magnetic field attracting property. Materials with a high magnetic permeability, such as ferrite or silicon steel plates, are known as such material. The insertion groove structure 216 made of a high permeability material can attract a substantial portion of the magnetic flux generated by the power transmitting coil 218, so that it can form a magnetic path around the insertion groove structure 216 as shown in FIG. 2.

In an exemplary embodiment, the power receiver 170 may be provided at the ends of the landing legs 150 of the UAV 100. When the three landing legs 150 sit on the circular conical surface 212, each of the three power receivers 170 can be easily slid down on each of the conical surfaces 212 and inserted into the insertion groove structure 216. In that state, the power receiving coils 174 can be automatically positioned in the three magnetic fields generated by the three power transmitting coils 218. In this regard, it is desirable that the circular conical surface 212 is as slippery as possible. Also, it is also desirable that each of the power receivers 170 has an outer surface with a low coefficient of friction.

In an exemplary embodiment, the three coil seating units 210 may be arranged in a Y-shape via the connection support 230. The three coil seating units 210 may be spaced apart from each other on the same plane at intervals of about 120 degrees. The insertion grooves 216 at their center points may be spaced apart to form a regular triangle. Of course, it is not necessarily required that the center points of the three coil seating units 210 should form an equilateral triangle. They may form a triangle of other shape. In addition, the coil seating units 210 may be so provided as to be matched with the arrangement of the three power receivers 170 of the UAV 100.

Figure 3:
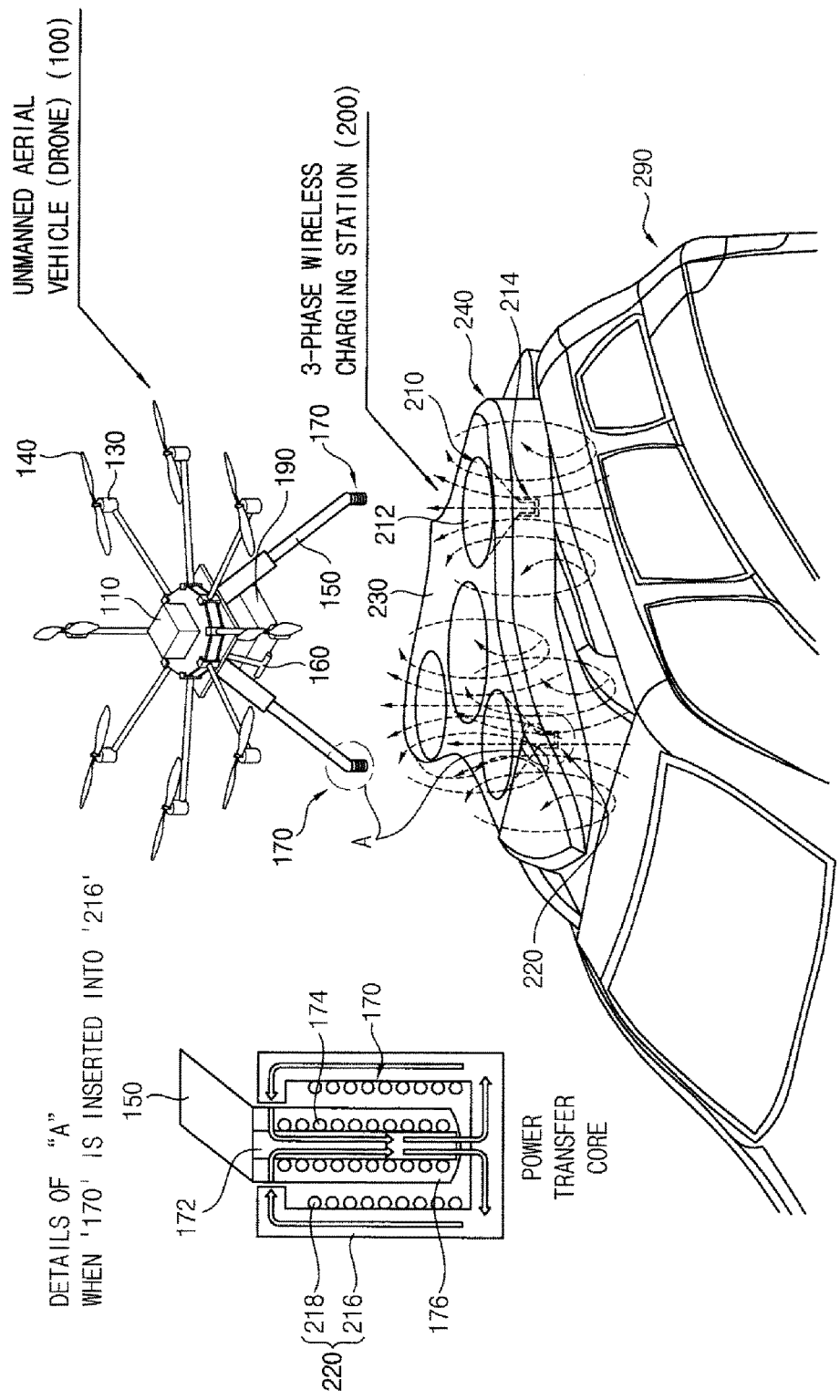
FIG. 3 illustrates a an exemplary state in which the three-phase wireless rechargeable UAV is landing onto the three-phase wireless charging apparatus for the UAV shown in FIG. 2 installed on a vehicle for delivery.

The connection support 230 connects and supports the three coil seating units 210 so that the three coil seating units 210 can be arranged like that. The connection support 230 may be provided in the form and structure to be suitable for the installation conditions of the three-phase wireless charging station 200. For example, as shown in FIG. 3, when the three-phase wireless charging station 200 is provided on the roof of a vehicle 290, it can be formed in a form suitable for the vehicle roof structure, for example, a shape capable of minimizing wind resistance.

In an exemplary embodiment, the three-phase AC power transmission unit 20 may include three power transmitting coils 218 and a transmitter resonator 24. The three power transmitting coils 218 may be disposed in the insertion groove structures 216 of the three coil seating units 210 respectively and they may be connected to each other in the form of Y-connection or Δ-connection. When three-phase ACs flow through the three power transmitting coils 218 respectively, magnetic fields are formed around the coil seating units 210, respectively.

In an exemplary embodiment, the transmitter resonator 24 may be implemented with three resonance capacitors connected in series or in parallel to the three power transmitting coils 218, respectively. Each of the resonance capacitors forms a resonant circuit together with each of the power transmitting coils 218. The resonance current flows in each of the resonant circuits, and the reactive power in the system can be minimized. By the resonance current, resonant magnetic coupling can be established between the three-phase power transmission unit 20 and the three-phase power reception unit 30, and thus the power can be wirelessly transferred wireless with a high efficiency. In other words, by the resonance capacitors, the power transfer efficiency can be increased and the magnitude of the power at the power source 22 can be reduced. The intensity of electromagnetic waves can be reduced, and the size of the entire system can be reduced.

In an exemplary embodiment, the three-phase power transmission unit 20 may include a three-phase power inverter 28 functioning as a three-phase AC power source 22. The three-phase power inverter 28 allows three-phase ACs to flow through three power transmitting coils 218. The three-phase power inverter 28 changes the DC or AC to three-phase ACs having a desired frequency and amplitude, and allows the three-phase ACs to flow through the three power transmitting coils 218 as phase currents, respectively.

Meanwhile, in an exemplary embodiment, the three-phase wireless chargeable UAV 100 may include a three-phase power reception unit 30, a resonant unit, a three-phase power converter, and a battery.

In an exemplary embodiment, the three-phase wireless chargeable UAV 100 is a kind of flight vehicle that may include a flight body 110, a plurality of motors 130 installed at a plurality of points of the flight body 110 or in a plurality of arms 120 connected to the flight body 110, and a plurality of propellers 140 connected to the rotating shafts of the plurality of motors 130 and capable of rotating by the rotational force of the motors 130 to allow the UAV 100 to fly. The flight vehicle may also include at least three landing legs 150 connected to the flight body 110 or the plurality of arms 120 and extending downward. In an exemplary embodiment, the three landing legs 150 can be widened outward at an angle so as to stably support the UAV 100 when landing on a plane. The distal ends of the three landing legs 150 form a triangular on a plane. The landing legs 150 may have a variable length structure. In addition, the landing legs 150 may be a foldable structure so as to be folded to a position where air resistance can be minimized during flight of the UAV 100, for example, by being concealed within or attached to the outside of the flying body 110, and to be unfolded to form a triangle during landing of the UAV 100.

The three-phase power reception unit 30 includes three power receivers 170. Each of the power receivers 170 may be provided at a predetermined point of each of the three landing legs 150. Preferably, if each of the power receivers 170 is provided at the distal end of each of the landing legs 150, they can also serve as a landing unit. Each power receiver 170 may include a coil winding rod 172 connected to a predetermined point of the landing leg 150 and provided as a coil core, that is, a magnetic path of the magnetic flux, and a power receiving coil 174 wound around or embedded in the coil winding rod 172. The power receiving coil 174 may be wound on the outer surface of the coil winding rod 172. The three power receiving coils 174 of the three power receivers 170 are connected to each other in the form of Y-connection or Δ-connection. Each of the power receivers 170 may further include a protection cap 176 for covering and protecting the coil winding rod 172 and the power receiving coil 174. The protection cap 176 can protect the power receiver 170 so as to function as a landing unit of the UAV 100.

In an exemplary embodiment of the present disclosure, each of the three power receiving coils 174 may be connected to the receiver resonator 34. The receiver resonator 34 minimizes the reactive power in the system by allowing the resonant current to flow through each of the three power receiving coils 174. The receiver resonator 34 may be implemented with three resonance capacitors connected in series or parallel to each of the three power receiving coils 174. The effect obtained by these resonance capacitors is as described above.

In an exemplary embodiment, the three-phase wireless rechargeable UAV 100 may further include a three-phase power converter 38 and a battery 40. The three-phase power converter 38 may be installed in the three legs 150 or the flight body 110. The three-phase power converter 38 receives the three-phase ACs induced by the three power receiving coils 174 along with the receiver resonator 34, and converts and outputs the three-phase ACs into a DC. The DC output from the three-phase power converter 38 is supplied to the battery 40 to be charged. The electric energy charged in the battery 40 is supplied as a power source for driving the plurality of motors 130. The battery 40 may be installed in the three legs 150 or the flight body 110.

FIG. 3 shows an application example in which the three-phase wireless charging station 200 is installed on the roof of a vehicle 290 according to an exemplary embodiment of the present disclosure.

The UAV 100 may perform a task of delivering an article 190 along with the vehicle 290, for example. The UAV 100 can charge the electric energy by landing on the three-phase wireless charging station 200 when necessary, while performing the task. The charging platform 240 may be secured to the roof of the vehicle 290 to facilitate landing of the UAV 100. A delivery fixture 160 for fixing the article 190 may be provided under the flight body 110 of the UAV 100.\

The UAV 100 can fly by a lift force and a propulsion force generated by the propeller 140 rotated by the motor 130. Electric energy charged in the battery 40 can be used as a driving power source for the motors 130.

For charging, the UAV 100 should land on the charging station 200. The UAV 100 may receive location information from the GPS or a differential GPS (not shown), and can automatically know the location of the three-phase wireless charging station 200. The UAV 100 can land on the charging station 200 using the location information. However, when the UAV 100 lands, various positional errors may occur due to various factors. In view of this, in an exemplary embodiment, a plurality of funnel-type UAV landing structures, that is, coil seating units 210 may be provided in the charging station 200. Each of the three coil seating units 210 may be a sink includes a circular conical surface 212 forming an inlet that becomes gradually narrower from the top to the bottom, and an insertion groove structure 216 provided at the lowest position of the circular conical surface 212 and in which the power transmitting coil 218 is disposed. In addition, a plurality of landing legs 150 and the power receivers 170 corresponding to the landing structures are provided in the UAV 100. Thus, it is possible to ensure accurate landing of the UAV 100. The UAV 100 descends and the power receivers 170 provided at the ends of the three landing legs 150 land on the circular conical surfaces 212 of the coil seating units 210. After landing, the UAV 100 stops driving the motor 130. The landing legs 150 and the power receivers 170 can be automatically slid down on the circular conical surface 212 which is inclined and enter the insertion groove structure 216 by the weight of the UAV 100.

In such a state, the power receiving coil 174 is completely surrounded by the power transmitting coil 218, as shown in the partial detail view marked "A" on the left side of FIG. 3. At this time, it is preferable that the insertion groove structure 216 and the coil winding rod 172 are made of a high permeability material so as to function as a magnetic core as shown in the figure. Since the magnetic core made of the high permeability material attracts more magnetic flux generated by the power transmitting coil 218, it is possible to reduce the magnetic flux leakage and increase the magnetic flux coupling with the power receiving coil 174. Examples of the high permeability material include ferrite, a silicon steel sheet, a high permeability alloy, and the like.

Figure 4:
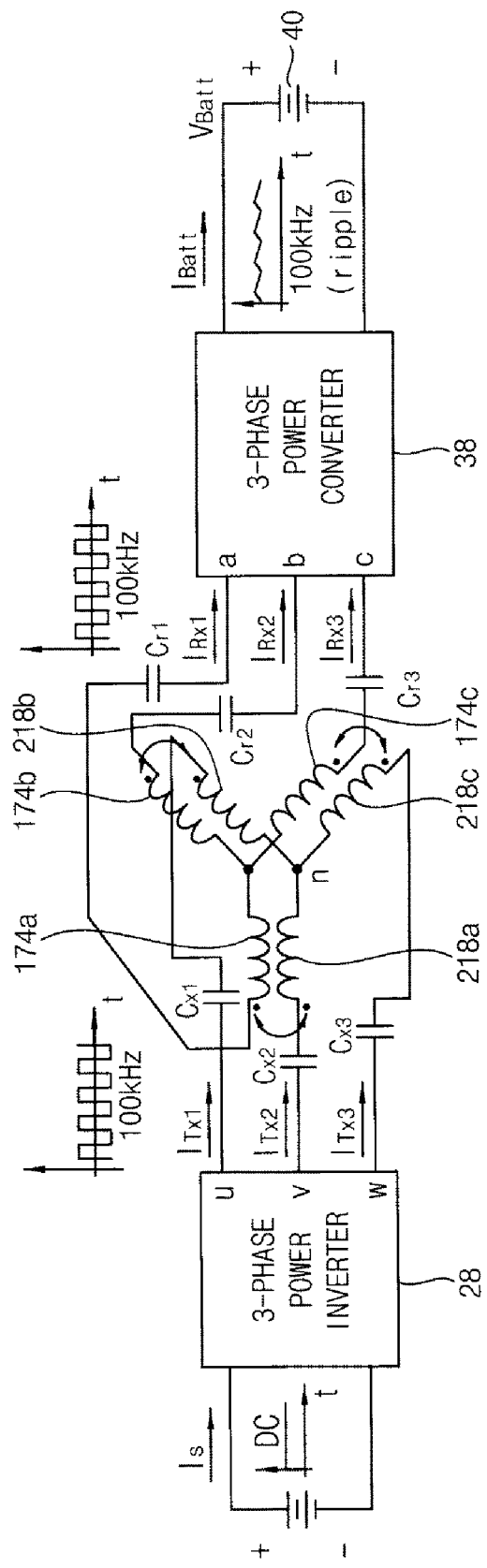
FIG. 4 is an electric circuit diagram of the three-phase wireless rechargeable UAV and the three-phase wireless charging apparatus for the UAV according to an exemplary embodiment of the present disclosure.

The three-phase wireless charging system 90 shown in FIG. 2 or FIG. 3 may be modeled as an electrical circuit diagram as shown in FIG. 4. The illustrated circuit has a series-series resonant topology where the power transmitting coils 218a, 218b and 218c and the transmission side resonance capacitors $C_{x1}$, $C_{x2}$, and $C_{x3}$ are connected to each other, respectively, in series, and the power receiving coils 174a, 174b and 174c and the reception side resonance capacitors $C_{r1}$, $C_{r2}$, and $C_{r3}$ are also connected to each other, respectively, in series. The three-phase power inverter 28 changes a DC $I_s$ of a predetermined rated voltage (for example, 12V) from a DC power source to three-phase ACs $I_{Tx1}$, $I_{Tx2}$, and $I_{Tx3}$ having a predetermined frequency. The three-phase power inverter 28 provides the three-phase ACs $I_{Tx1}$, $I_{Tx2}$, and $I_{Tx3}$ to the power transmitting coils 218a, 218b, and 218c, respectively. As a result, magnetic fluxes are generated by the power transmitting coils 218a, 218b, and 218c of the respective phases. The magnetic fluxes induce the three-phase ACs $I_{Rx1}$, $I_{Rx2}$, and $I_{Rx3}$ in the power receiving coils 174a, 174b, and 174c. The induced three-phase ACs $I_{Rx1}$, $I_{Rx2}$, and $I_{Rx3}$ are input to the three-phase power converter 38 and converted into a DC. The converted DC voltage $V_{Batt}$ and the current $I_{Batt}$ are supplied to the battery 40 to be charged. The electric energy charged in the battery 40 is used as driving power of the motor 130 to rotate the propellers 140 as described above.

In order to deliver the same power, the phase current of the three-phase mode is smaller than that of the single phase mode. Therefore, the three-phase wireless charging system 90 according to the present disclosure can reduce the intensity of the magnetic field generated around the three-phase wireless charging system 90, compared to the single phase wireless power charging system. The EMI noise can also be reduced by the characteristics of the three-phase system.

Figure 5A:
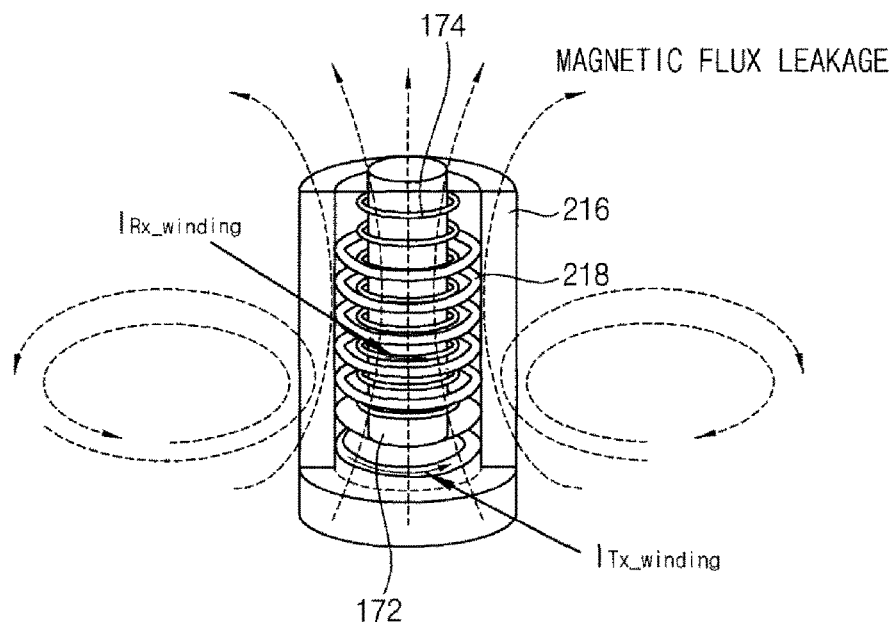
FIG. 5A to 5C are views for explaining distribution of magnetic flux leakage of a three-phase wireless charging system for the UAV according to a preferred embodiment of the present disclosure.
Figure 5B:
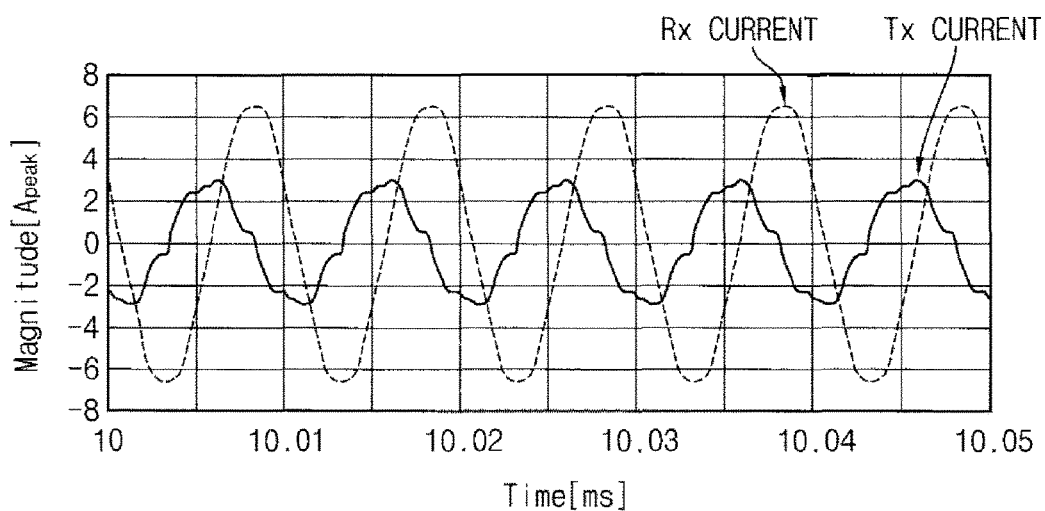
Figure 5C:
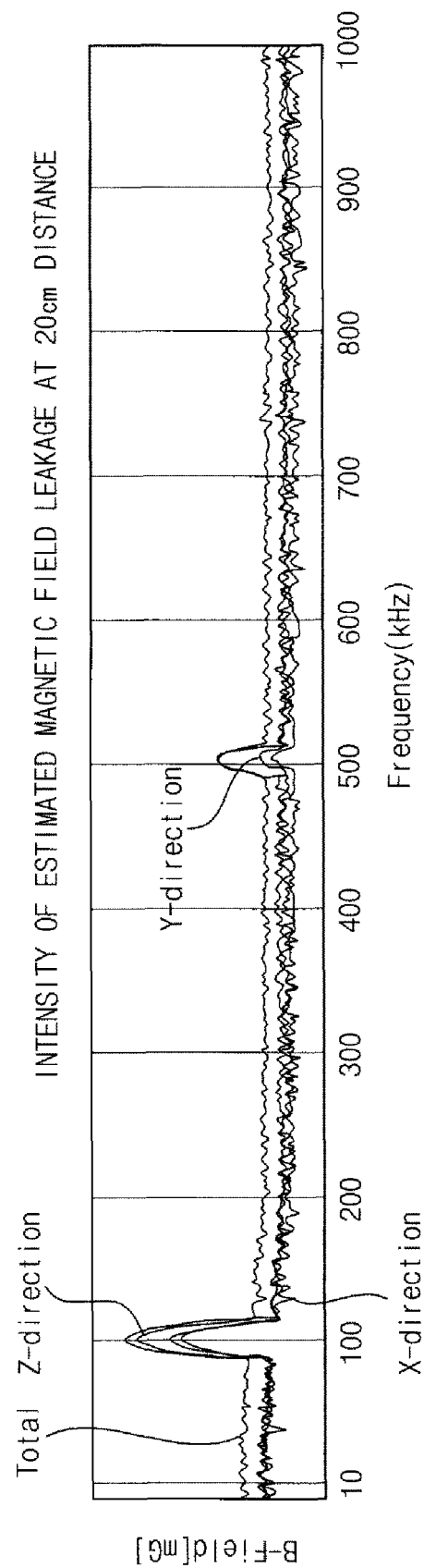

On the other hand, FIG. 5A illustrates a power transfer core in a state that the power receiving coil 174 is enclosed by the power transmitting coil 218 after the coil winding rod 172 enters the insertion groove structure 216. FIG. 5B illustrates a waveform of the current ($R_x$ current) induced in the power receiving coil 174 when an AC ($T_x$ current) supplied by the three-phase power inverter 28 flows through the power transmitting coil 218. FIG. 5C shows the intensity of the magnetic field leakage at a position 20 cm away from the power transfer core. As shown in FIG. 5C, the resonant frequency component of the three-phase power transmission unit 20, which is the power source, and the corresponding harmonic component are dominant in the magnetic field distribution around the three-phase wireless charging system 90. When the three-phase power inverter 28 of the three-phase power transmission unit 20 has an operating frequency of, for example, 100 kHz, the resonant frequency largely includes a harmonic component of, for example, 500 kHz in addition to its operating frequency component. Accordingly, the magnitude of the magnetic field is large in the operating frequency band as well as the harmonic frequency band.

Such a magnetic field may cause the EMI to the UAV 100. It is desirable to minimize the magnetic field directed toward the UAV 100 to minimize the EMI. To this end, in an exemplary embodiment, the three-phase wireless charging system 90 may further include a magnetic flux leakage shielding coil 300 to block a magnetic field directed toward the UAV 100.

Figure 6:
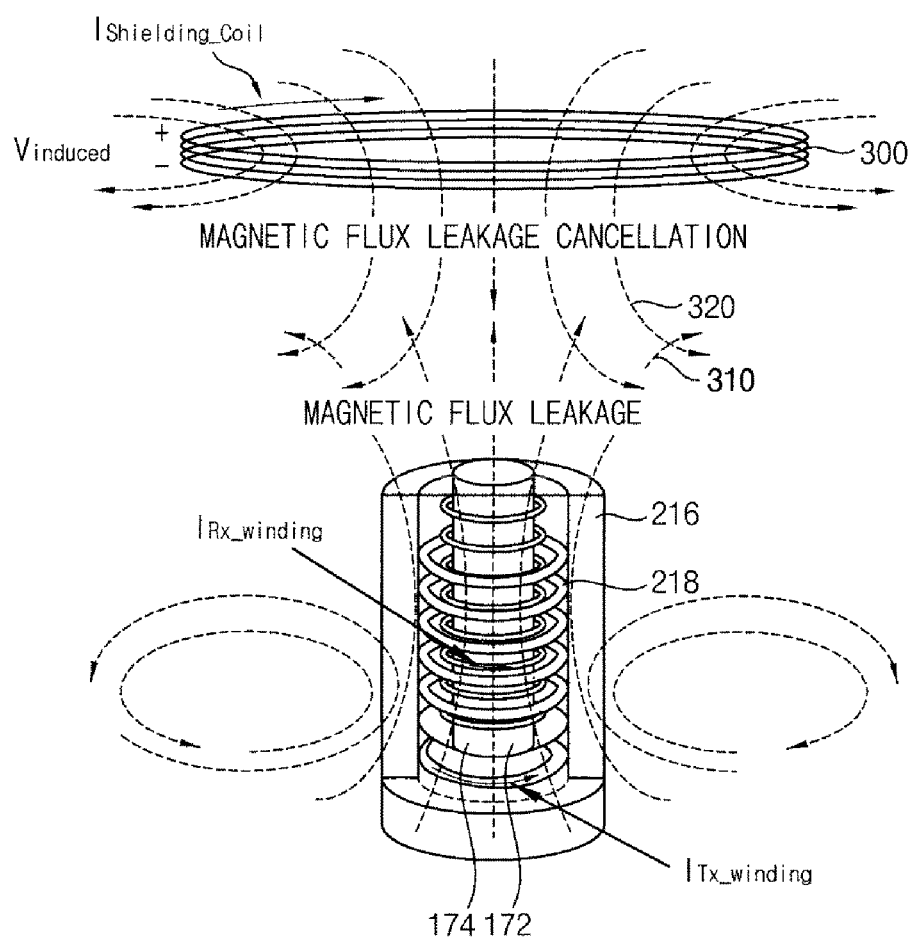
FIG. 6 conceptually illustrates a magnetic flux leakage shielding coil for the three-phase wireless charging apparatus according to an exemplary embodiment of the present disclosure.

FIG. 6 conceptually illustrates a magnetic flux leakage shielding coil for cancelling the magnetic flux leakage which is a part of the magnetic flux generated by the power transmitting coil 218 according to an exemplary embodiment of the present disclosure. As shown in FIG. 6, the magnetic flux leakage shielding coil 300 may be positioned above the power transmission coil 218 to shield magnetic flux leakage from the power transfer coil 218 directed toward the flight body 110. Since the magnetic flux leakage spreads widely in the upward direction, the radius of the magnetic flux leakage shielding coil 300 may be determined in consideration of such characteristics and the area for shielding the magnetic flux leakage.

Figure 7:
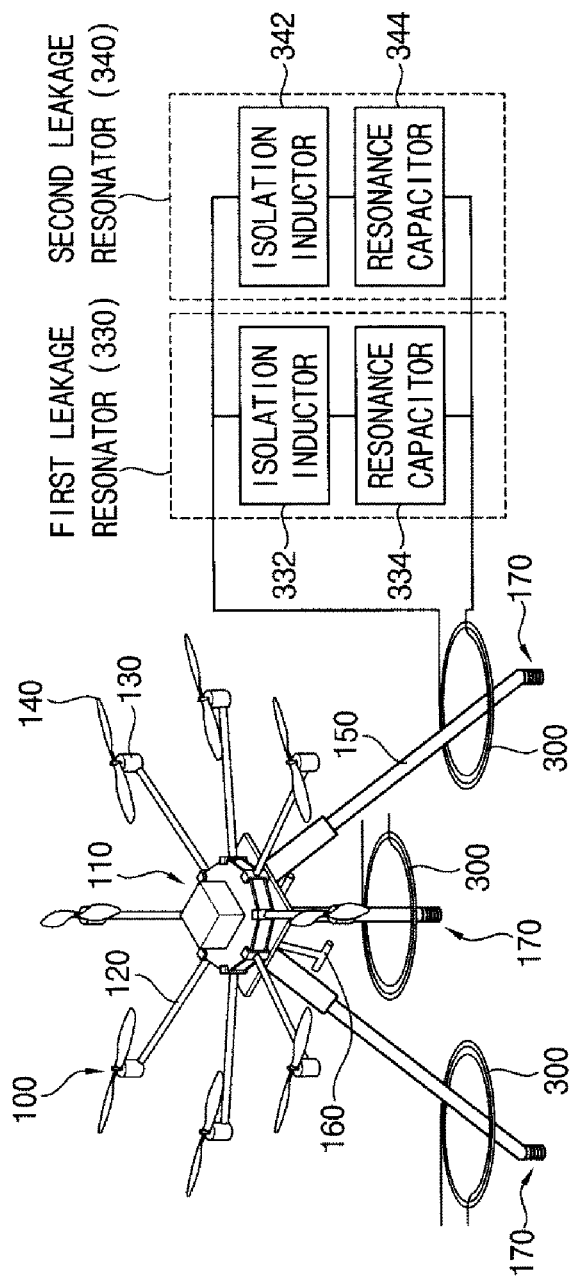
FIG. 7 illustrates an exemplarily embodiment of a magnetic flux leakage shielding scheme of the three-phase wireless charging apparatus for the UAV.

FIG. 7 illustrates a case where the magnetic flux leakage shielding coil 300 is installed in the three-phase wireless charging system 90 for the UAV 100. In an exemplary embodiment, the magnetic flux leakage shielding coil 300 may be installed in any one or both of the UAV 100 and the wireless charging station 200. The magnetic flux leakage shielding coil 300 may be installed in the wireless charging station 200 only since it is preferable to lighten the weight of the UAV 100 as much as possible. When installed in the wireless charging station 200, the magnetic flux leakage shielding coil 300 may be positioned, for example, around each of the entrances of the coil seating units 210. In an exemplary embodiment, the magnetic flux leakage shielding coil 300 may be buried, not protruding, in the vicinity of the entrance of the coil seating unit 210 so as not to obstacle landing of the UAV 100.

With reference to FIGS. 6 and 7, this magnetic field leakage shielding structure allows that the magnetic flux leakage 310 from the power transmitting coil 218 is interlinked with the magnetic flux leakage shielding coil 300, whereby a voltage $V_{induced}$ can be induced in the magnetic flux leakage shielding coil 300. Thus, an induced current $I_{Shiekding\_Coil}$ flows through the magnetic flux leakage shielding coil 300 by the induced voltage $V_{induced}$ and a magnetic field 320 is generated by the induced current $I_{Shiekding\_Coil}$ in the direction opposite to the direction of the magnetic field leakage. This magnetic field 320 can cancel the magnetic flux leakage 310 from the power transfer coil 218.

In an exemplary embodiment, in order to effectively cancel the magnetic flux leakage, the magnetic flux leakage shielding coil 300 may be formed of a resonant circuit to enhance the strength of the magnetic field 320. In the embodiment, a leakage resonance unit including an isolation inductor and a resonance capacitor may be added to the magnetic flux leakage shielding coil 300. In an exemplary embodiment, at least one of the first leakage resonator 330 and the second leakage resonator 340 can be added. FIG. 7 illustrates a case where the first leakage resonator 330 and the second leakage resonator 340 are added to the magnetic flux leakage shielding coil 300. The first leakage resonator 330 including an isolation inductor 332 and a resonance capacitor 334 is added to the magnetic flux leakage shielding coil 300 in series to form an RLC resonance circuit. The second leakage resonator 340 including the series-connected isolation inductor 343 and the resonance capacitor 344 is also added in series to the magnetic flux leakage shielding coil 300 and connected with the first leakage resonator 330 in parallel, to enhance the resonance.

Figure 8:
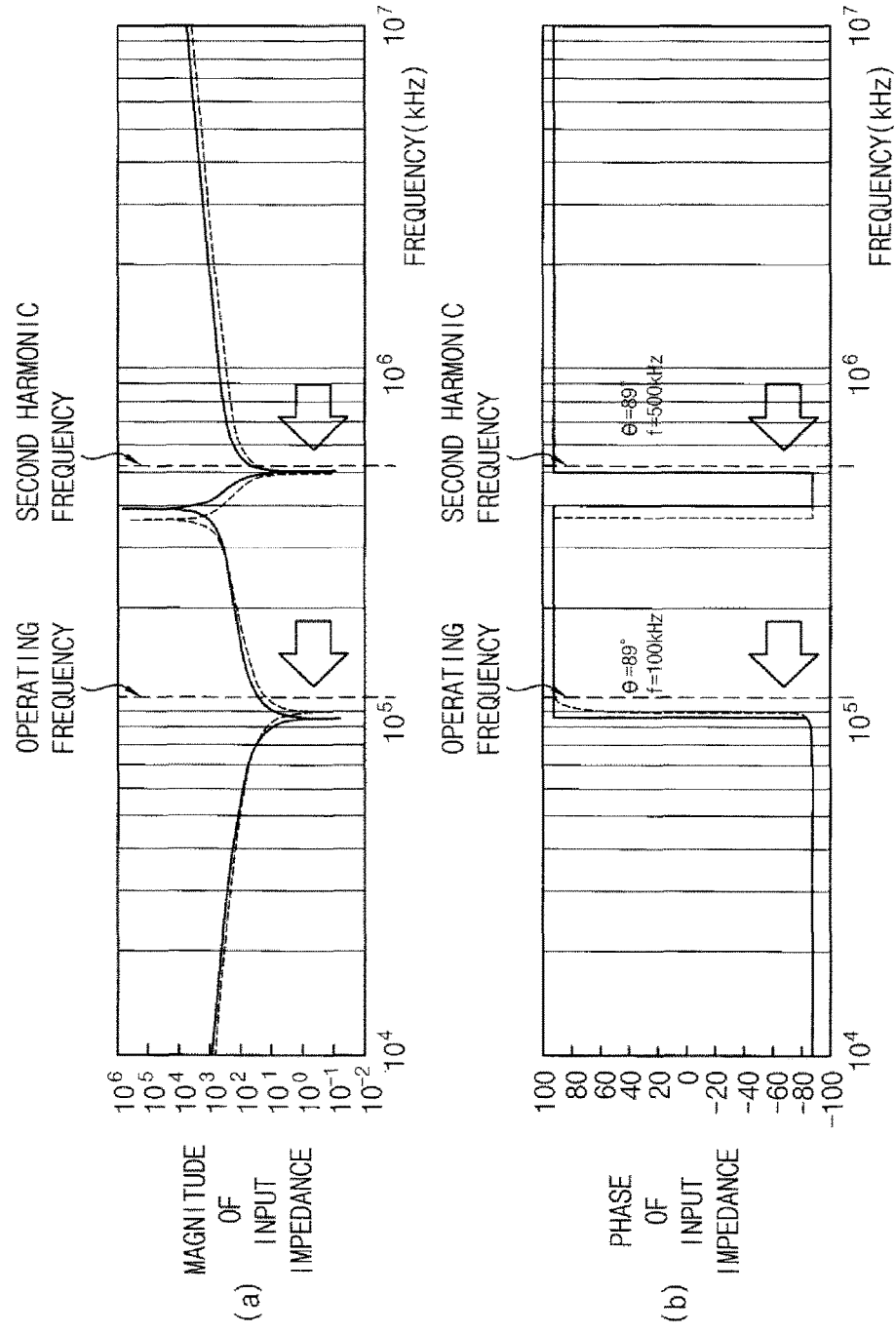
FIG. 8 illustrates graphs showing magnitude and phase of a multiple resonant impedance of the magnetic flux leakage shielding scheme of the three-phase wireless charging apparatus.

The first leakage resonator 330 may generate resonance corresponding to the operating frequency component of the system. The second leakage resonator 340 may cause resonance corresponding to the harmonic frequency component of the system. FIG. 8 illustrates the magnitude and phase of a multiple resonant impedance of the magnetic flux leakage shielding scheme shown in FIG. 7. As shown in FIG. 8, by the addition of the first leakage resonator 330 and the second leakage resonator 340, it can be known that the magnitude of the input impedance of the magnetic flux leakage shielding coil 300 is sharply reduced at the operating frequency band and the second harmonic frequency band. This means that resonance can occur in both frequency bands. Thereby, the magnetic flux leakage shielding coil 300 can more effectively cancel the magnetic flux leakage from the power transmitting coil 218.

Figure 9:
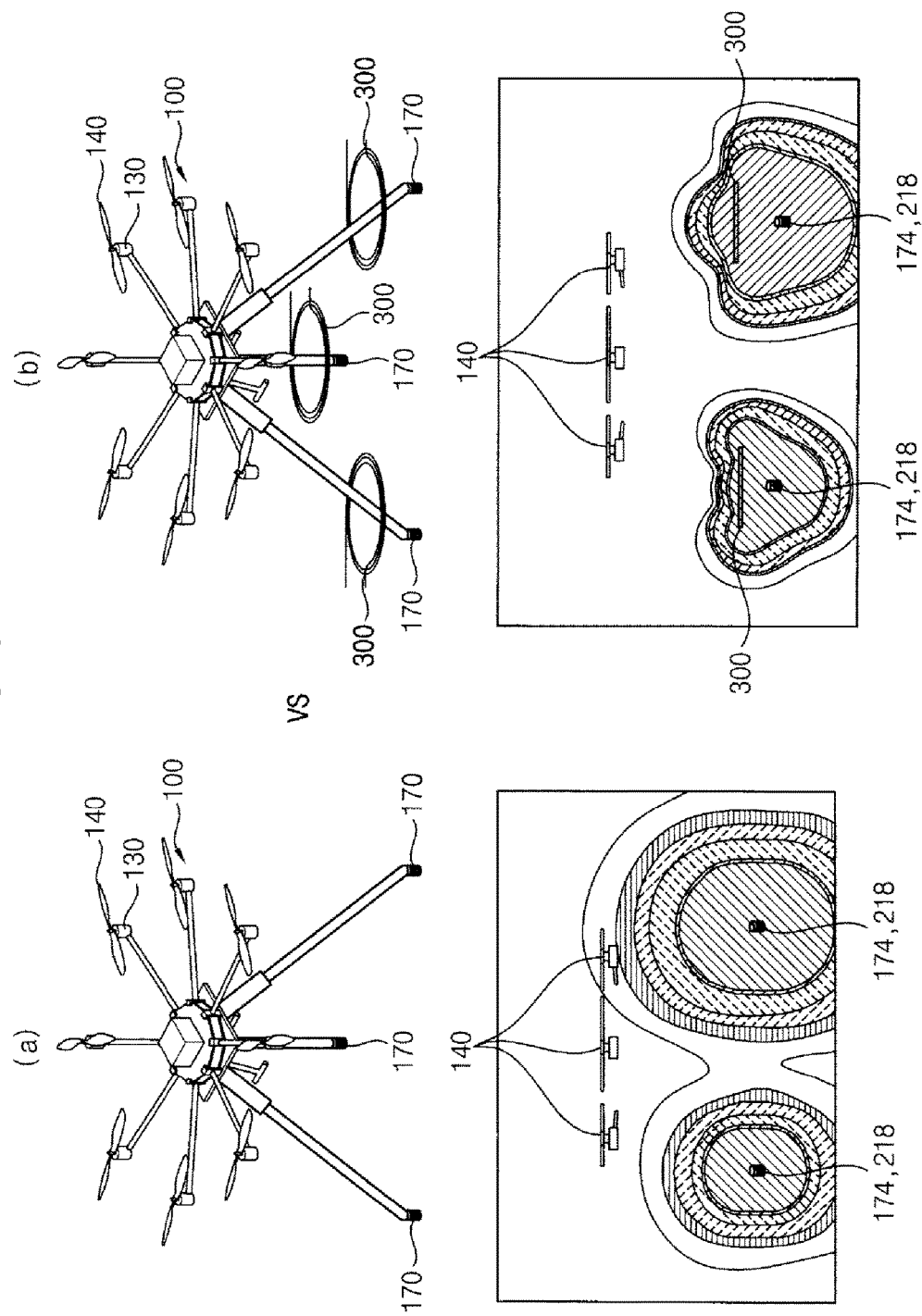
FIG. 9 illustrates distributions of the resonant magnetic fields in the case where the magnetic flux leakage shielding scheme is not employed and in the case where the magnetic flux leakage shielding scheme is employed.

FIG. 9 illustrates the magnetic field distributions of the two cases. The first case where the magnetic flux leakage shielding coil 300 is not employed is shown in (a) of FIG. 9. The second case where the magnetic flux leakage shielding coil 300 is employed is shown in (b) of FIG. 9. In the first case, the magnetic field generated by the power transmitting coil 218 is distributed near or beyond the propeller 140 of the UAV 100. In this case, various flight-related electronic parts or devices installed in the flight body 110 are influenced by the magnetic field leakage, which may cause malfunction due to the EMI. In contrast, in the second case, due to the cancellation of the magnetic flux leakage by the magnetic flux leakage shielding coil 300 most of the magnetic field generated by the power transmitting coil 218 is suppressed to be distributed only under the magnetic flux leakage shielding coil 300. Thus, the second case is from the EMI issue.

The present disclosure can be usefully used for the wireless charging of the UAV. In addition, electrical and electronic equipment that require charging can be widely applied without restriction.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A three-phase wireless-chargeable unmanned aerial vehicle (UAV), comprising:
   a flight vehicle including at least three landing legs;
   a three-phase power reception unit, including three coil winding members provided on three landing legs and provided as magnetic paths of magnetic fluxes, and three power receiving coils that are wound around or built in the three coil winding members respectively and connected to each other in a Y-connection or Δ-connection, for wirelessly receiving power from a three-phase wireless power transfer (WPT) apparatus through three-phase alternating currents (AC) which are induced by three-phase alternating magnetic fluxes, generated by the three-phase WPT apparatus, that interlink with the three power receiving coils, respectively;
   a three-phase power converter, being installed in the flight vehicle, for converting the three-phase ACs induced in the three power receiving coils into a direct current (DC); and
   a battery, being installed in the flight vehicle, for charging the DC output from the three-phase power converter.

2. The three-phase wireless-chargeable UAV according to claim 1, wherein the three-phase power reception unit further includes a protection cap for protecting the coil winding member and the power receiving coils by enclosing the same together.

3. The three-phase wireless-chargeable UAV according to claim 1, further comprising a resonator, being connected to each of the three power receiving coils, for minimizing reactive power in a system by causing a resonance current to flow through each of the three power receiving coils.

4. The three-phase wireless-chargeable UAV to claim 1, wherein each of the three coil winding members is connected to an end of each of the three landing legs and functions as a landing part of the UAV.

5. A three-phase wireless-charging apparatus for an unmanned aerial vehicle (UAV), comprising:
   a charging platform including a coil seating unit for seating three power receiving coils that are connected to each other in a Y-connection or Δ-connection and installed in the UAV for wirelessly receiving electric power; and
   a three-phase power transmission unit including three power transmitting coils, being installed in the coil seating unit and connected to each other in a Y-connection or Δ-connection, for forming three magnetic fields in the coil seating unit by flowing three-phase ACs,
   wherein when the three power receiving coils are seated on the coil seating unit, the three power transmitting coils are magnetically coupled with the three power receiving coils through the three magnetic fields, thereby wirelessly transferring three-phase power to the three power receiving coils.

6. The three-phase wireless-charging apparatus according to claim 5, wherein the coil seating unit includes three coil seating sinks for receiving the three power receiving coils, respectively.

7. The three-phase wireless-charging apparatus according to claim 6, wherein the three power receiving coils are installed on three landing legs of the UAV, and when the three landing legs are seated in the three coil seating sinks, the three power receiving coils are automatically positioned in the three magnetic fields generated by the three power transmitting coils, respectively.

8. The three-phase wireless-charging apparatus according to claim 6, wherein each of the three coil seating sinks includes a circular conical surface forming an inlet that becomes gradually narrower from the top to the bottom, and an insertion groove provided at the lowest position of the circular conical surface, wherein each of the power transmitting coils is disposed in the insertion groove, and wherein the landing legs slide downward when each of the three landing legs lands at any point on the circular conical surface so as to automatically enter the insertion groove and to be positioned in each of the three magnetic fields.

9. The three-phase wireless-charging apparatus according to claim 8, wherein at least a side wall and a bottom defining the insertion groove are made of a ferromagnetic material and provided as a magnetic path for a magnetic flux generated by each of the three power transmitting coils.

10. The three-phase wireless-charging apparatus according to claim 5, further comprising a transmitter resonator, being connected to each of the three power transmitting coils, for allowing a resonant current to flow through the three power transmitting coils.

11. The three-phase wireless-charging apparatus according to claim 5, wherein a three-phase power transmission unit further comprises a three-phase power inverter for changing a DC into three-phase ACs of a desired frequency and providing the three-phase ACs to each of the three power transmitting coils.

12. The three-phase wireless-charging apparatus according to claim 5, wherein the transmitter resonator includes a plurality of resonance capacitors connected in series or in parallel to each of the three power transmitting coils.

13. The three-phase wireless-charging apparatus according to claim 5, further comprising three magnetic flux leakage shielding coils for shielding magnetic flux leakage without being interlinked with the three power receiving coils among the magnetic fluxes generated by the three power transmitting coils, thereby minimizing an influence of the magnetic flux leakage on a magnetic flux leakage region.

14. The three-phase wireless-charging apparatus according to claim 13, further comprising a leakage resonator, being connected to each of the three magnetic flux leakage shielding coils, for cancelling the magnetic flux leakage based on resonance caused by a current induced by the magnetic flux leakage.

15. The three-phase wireless-charging apparatus according to claim 14, wherein the leakage resonator comprises at least any one of three first leakage resonators causing resonance corresponding to an operating frequency component of a system and three second leakage resonators causing resonance corresponding to the harmonic frequency components of the system.

16. The three-phase wireless-charging apparatus according to claim 13, wherein the three magnetic flux leakage shielding coils are disposed around entrances of the three coil seating units, respectively.

17. A three-phase wireless power transfer (WPT) system, comprising:
 a three-phase power transmission unit including three power transmitting coils for generating magnetic fields by allowing three-phase alternating currents to flow, respectively, and transmitter resonators, being coupled to the three power transmitting coils respectively, for allowing resonant currents to flow for minimizing a reactive power in a system; and
 a three-phase power reception unit including three power receiving coils which are arranged to be paired with the three power transmitting coils one to one such that each of the three power receiving coils is interlinked with the magnetic flux generated by each of the three power transmitting coils, thereby allowing an induced current to flow by the magnetic flux interlinkage; and three receiver resonators added to each of the three power receiving coils so as to allow resonant currents to flow for minimizing the reactive power in the system.

18. The three-phase WPT system according to claim 17, wherein the three-phase power transmission unit further includes a three-phase power inverter that changes DC to three-phase ACs of a desired frequency and provides the three-phase ACs to the three power transmitting coils, respectively.

19. The three-phase WPT system according to claim 17, wherein the three-phase power reception unit comprises a three-phase power converter for converting three-phase ACs induced by the three receive resonators and the three power receiving coils into a DC; and a battery for charging the DC output from the three-phase power converter.

20. The three-phase WPT system according to claim 17, further comprising three magnetic flux leakage shielding coils for shielding magnetic flux leakages without being interlinked with the three power receiving coils among the magnetic fluxes generated by the three power transmitting coils, thereby minimizing influence of the magnetic flux leakage on a magnetic flux leakage region.

* * * * *